United States Patent
Krishnamurthy et al.

(10) Patent No.: US 6,617,892 B2
(45) Date of Patent: *Sep. 9, 2003

(54) SINGLE ENDED INTERCONNECT SYSTEMS

(75) Inventors: Ram K. Krishnamurthy, Portland, OR (US); Krishnamurthy Soumyanath, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,089

(22) Filed: Sep. 18, 1998

(65) Prior Publication Data

US 2002/0008559 A1 Jan. 24, 2002

(51) Int. Cl.$^7$ .............................. H03B 1/00; H03K 3/00
(52) U.S. Cl. ........................... 327/112; 327/63; 327/77; 327/206; 327/534; 326/58; 326/83; 326/95; 326/112
(58) Field of Search ................................ 327/63, 65–67, 327/70, 77–81, 205, 206, 534, 535, 112, 108; 326/28, 95, 96, 119, 112, 121, 56, 57, 58, 83, 86, 87, 93

(56) References Cited

U.S. PATENT DOCUMENTS

| | | | |
|---|---|---|---|
| 4,616,148 A | | 10/1986 | Ochii et al. .................... 327/55 |
| 4,804,868 A | * | 2/1989 | Massuda et al. ............. 326/110 |
| 4,858,180 A | * | 8/1989 | Murdoch ....................... 327/72 |
| 4,885,479 A | | 12/1989 | Oritani ......................... 326/25 |
| 5,034,623 A | | 7/1991 | McAdams .................... 327/74 |
| 5,086,427 A | * | 2/1992 | Whittaker et al. .......... 370/85.1 |
| 5,315,175 A | * | 5/1994 | Langner ...................... 326/21 |

(List continued on next page.)

OTHER PUBLICATIONS

P. Larsson et al., "Noise in Digital Dynamic CMOS Circuits," IEEE Journal of Solid–State Circuits, vol. 29, No. 6, Jun. 1994, p. 655–662.

(List continued on next page.)

Primary Examiner—Terry D. Cunningham
Assistant Examiner—Quan Tra
(74) Attorney, Agent, or Firm—Alan K. Aldous (57) ABSTRACT

In some embodiments, the invention includes an interconnect system having a single ended driver and a single ended hysteretic receiver. A single ended interconnect is coupled between the single ended driver and single ended receiver. In other embodiments, the invention involves an interconnect system including interconnects, single ended drivers, and single ended hysteretic receivers connected to respective ones of the interconnects. The single ended drivers receive respective data-in signals and an enable signal and wherein the drivers transmit interconnect signals on the interconnects when the enable signal is asserted. In yet other embodiments, the invention includes an interconnect system having interconnects, quasi-static drivers and receivers connected to respective ones of the interconnects. The quasi-static drivers to transmit interconnect signals on the interconnects, the quasi-static drivers receive a clock signal and respective data-in signals, and wherein the interconnect signals are pre-discharge when the clock signal changes from a first to a second state, and wherein when the clock signal is in the first state, the interconnect signals are related to the data-in signals. In still other embodiments, the invention includes a pseudo differential interconnect system and an interconnect system with a dual rail driver.

14 Claims, 9 Drawing Sheets

U.S. PATENT DOCUMENTS

| | | | |
|---|---|---|---|
| 5,461,338 A | | 10/1995 | Hirayama et al. ........... 327/534 |
| 5,483,181 A | | 1/1996 | D'Souza ....................... 326/98 |
| 5,559,461 A | * | 9/1996 | Yamashina et al. .......... 327/305 |
| 5,568,062 A | | 10/1996 | Kaplinsky .................... 326/27 |
| 5,594,361 A | * | 1/1997 | Campbell ..................... 326/24 |
| 5,604,450 A | | 2/1997 | Borkar et al. .................. 326/82 |
| 5,644,255 A | * | 7/1997 | Taylor .......................... 326/81 |
| 5,661,414 A | * | 8/1997 | Shigehara et al. ............. 326/81 |
| 5,669,684 A | * | 9/1997 | Agan ........................... 326/81 |
| 5,677,641 A | * | 10/1997 | Nishio et al. ................ 326/121 |
| 5,814,899 A | | 9/1998 | Okumura et al. ............. 307/64 |
| 5,852,373 A | | 12/1998 | Chu et al. ...................... 326/98 |
| 5,892,372 A | | 4/1999 | Ciraula et al. ................. 326/96 |
| 5,986,473 A | * | 11/1999 | Krishnamurthy et al. ..... 326/83 |
| 5,994,918 A | * | 11/1999 | Mehra .......................... 326/30 |
| 6,002,292 A | | 12/1999 | Allen et al. .................. 327/379 |
| 6,012,131 A | * | 1/2000 | Kang ........................... 711/205 |
| 6,014,041 A | * | 1/2000 | Somasekhar et al. ........ 326/115 |
| 6,078,195 A | * | 6/2000 | Chen ........................... 326/119 |

OTHER PUBLICATIONS

K. Shepard et al., "Noise in Deep Submicron Digital Design," ICCAD '96, pp. 524,31, 1996.

Z. Wang et al., "Fast Adders Using Enhanced Multiple–Output Domino Logic," IEEE Journal of Solid–State Circuits, vol. 32, No. 2, Feb. 1997, pp. 206–214.

N. Weste et al., "Principles of CMOS VLSI Design" (Addison–Wesley 2nd Edition, 1993). pp. 308–311.

Y. Nakagome et al. "Sub–1–V Swing Internal Bus Architecture for Future Low–Power ULSI's" IEEE Journal of Solid–State Circuits, vol. 28, No. 4, Apr. 1993, pp. 414–419.

T. Sakurai et al. "Low–Power CMOS Design through Vth Control and Low–Swing Circuits" Proceedings of Int'l Symp. On Low Power Electronics and Design, Aug. 18, 1997, pp. 1–6.

H. Zhang et al. "Low–Swing Interconnect Interface Circuits," Proceedings of Int'l Symp. On Low Power Electronics and Design, Aug. 10, 1998, pp. 161–166.

M. Haycock et al., "A 2.5 Gb/s Bidirectional Signaling Technology," Proceedings of IEEE Hot Interconnects Symposium, Aug. 21, 1997, pp. 149–156.

* cited by examiner

SINGLE ENDED INTERCONNECT SYSTEMS

BACKGROUND OF THE INVENTION

1. Technical Field of the Invention

The present invention relates to interconnect systems including a driver, interconnect, and receiver.

2. Background Art

Point-to-point on-chip interconnects between and within Functional Unit Blocks (FUBs) in semiconductor chips have evolved with integration as major on-chip performance and power bottlenecks. This is primarily because interconnect capacitance per unit length, dominated by sidewall fringing and cross-coupling, may increase hyperbolically with lateral dimension scaling and hence scale slower than does gate capacitance.

Figure 1:
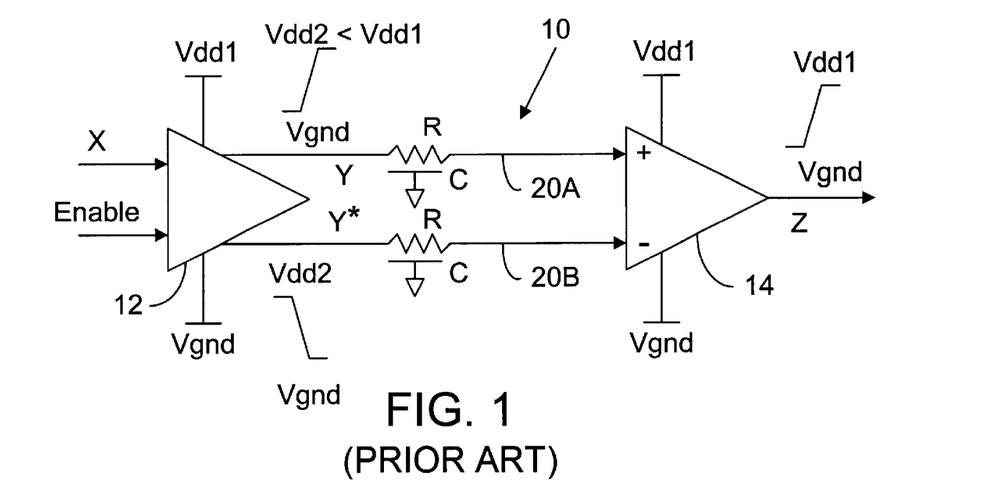
FIG. 1 is a schematic representation of a prior art differential interconnect system including a differential driver, differential interconnects, and a differential receiver.

Mixed voltage swing based techniques have been studied for high performance/low power on-chip datapath interconnects. In mixed voltage swings techniques, the interconnects are driven at a reduced voltage swing, offering significant dynamic power and driver delay reduction. Mixed-swing techniques include those involving fully-differential interconnects. For example, FIG. 1 illustrates an interconnect system 10 including a driver 12 and a receiver 14. A single ended digital signal X having a swing between Vgnd and Vdd1 is received by driver 12. Signal X is converted by driver 12 into reduced swing signals Y and Y* on interconnects 20A and 20B (where Y* is the complement of Y). The resistance and capacitance of the interconnect is represented schematically by a resistor R and a capacitor C. Both signals Y and Y* have a swing of between Vgnd and Vdd2, where Vdd2<Vdd1. Signals Y and Y* are received by receiver 14 and converted therein back to a single ended signal Z have a full swing of between Vgnd and Vdd1 and which follows signal X or is its complement. Some prior art interconnect systems include an enable signal.

Noise immunity would be decreased by lowering the signal swing, however, the fully-differential interconnect technique helps improve noise immunity through common mode noise rejection. Further, fully differential receivers can avoid static power consumption during swing restoration. However, such approaches entail approximately a 2X penalty in interconnect layout area and effective switched capacitance per cycle due to their fully differential nature. Therefore, power reduction achieved due to the reduced swing is offset by the power penalty paid in driving the 2X high switched capacitance.

Accordingly, there is a need for an interconnect system that reduces power consumption and/or interconnect area.

SUMMARY

In some embodiments, the invention includes an interconnect system having a single ended driver and a single ended hysteretic receiver. A single ended interconnect is coupled between the single ended driver and single ended receiver.

In other embodiments, the invention involves an interconnect system including interconnects, single ended drivers, and single ended hysteretic receivers connected to respective ones of the interconnects. The single ended drivers receive respective data-in signals and an enable signal and wherein the drivers transmit interconnect signals on the interconnects when the enable signal is asserted.

In yet other embodiments, the invention includes an interconnect system having interconnects, quasi-static drivers and receivers connected to respective ones of the interconnects. The quasi-static drivers to transmit interconnect signals on the interconnects, the quasi-static drivers receives a clock signal and respective data-in signals, and wherein the interconnect signals are pre-discharge when the clock signal changes from a first to a second state, and wherein when the clock signal is in the first state, the interconnect signals are related to the data-in signals.

In still other embodiments, the invention includes a pseudo differential interconnect system and an interconnect system with a dual rail driver.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

A. System Overview
B. Drivers
  1. Drivers with Low Voltage Swing
  2. Drivers with Full Swing
  3. Quasi-Static Driver
  4. Dual-Rail Pseudo-Differential Driver
C. Receiver Circuits
  1. Hysteretic Receivers
  2. A Receiver for Quasi-Static Drivers
D. Bidirectional Signaling
E. Other Information and Embodiments A. System Overview Referring to FIG. 2, a single ended interconnect system 50 includes a single ended driver 54 and a single ended receiver 58 connected through a single ended interconnect 66. Interconnect 66 may be a relatively long point-to-point on-chip datapath interconnect such as may be included in a microprocessor, digital signal processor, memory chip, or other integrated circuit chip, or be used between chips. Driver 54 receives a single ended Data-In (Din) signal, having a swing between Vgnd and Vdd, and converts it to a single ended interconnect signal Q, having a swing between Vgnd and Q-High. Depending on the details of driver 54, Q-High is equal to or less than Vdd. Depending on the details of driver 54, Q follows signal Data-In or is its complement. Receiver 58 receives interconnect signal Q and provides a signal Data-Out (Dout), which has a swing between Vgnd and Vdd and follows signal Data-In or is its complement. Receiver 58 may also provide a Dout* signal which is the complement or inverse of Dout. R and C are the inherent resistance and capacitance of interconnect 66. Because of R, the voltage of signal Q will be reduced between driver 54 and receiver 58. In some embodiments, the amount of the reduction is negligible. Where that reduction is not negligible, there may be some decrease in noise immunity. However, the noise immunity may be improved by a hysteretic receiver described below.

A single ended driver is one that provides an interconnect signal on a single interconnect rather than also providing a complementary signal on a parallel interconnect as in prior art system 10 in FIG. 1. A single ended receiver is one that receives an interconnect signal on a single interconnect rather than two interconnects as in prior art system 10 in FIG. 1. A single ended signal is one where the information is conveyed in a single signal rather than through a signal and its complement in parallel. A single ended interconnect system is one with a single ended driver and single ended receiver.

Figure 2:
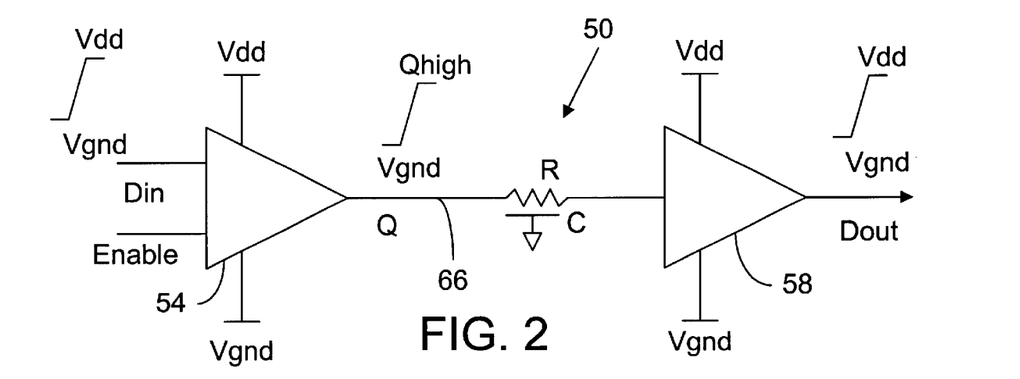
FIG. 2 is a schematic representation of a single ended interconnect system including single ended driver, an interconnect, and a single ended receiver according to some embodiments of the invention.
Figure 3:
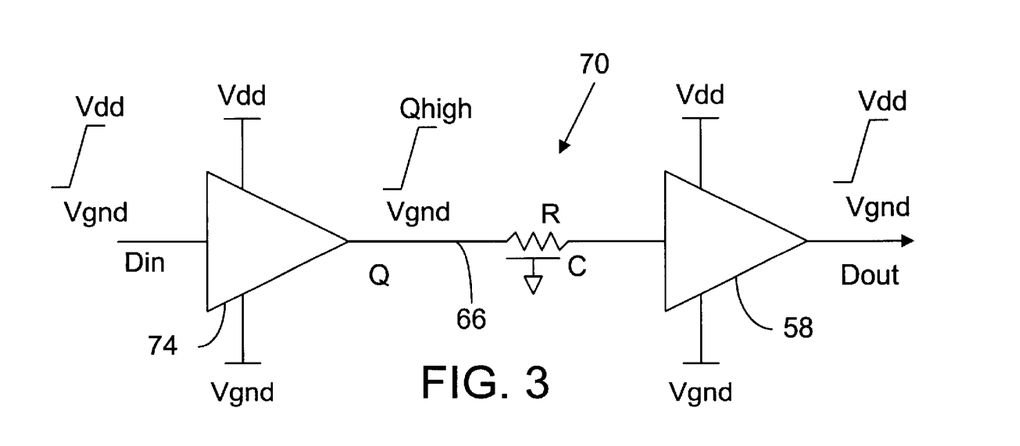
FIG. 3 is a schematic representation of a single ended interconnect system including single ended driver, interconnect, and receiver according to some embodiments of the invention.

Referring to FIG. 3, single ended interconnect system 70 is like system 50 in FIG. 2, except that a driver 74 of system 70 does not receive an enable signal and driver 54 of system 50 does. In the case of tri-stated drivers, multiple drivers can drive the same interconnect (with only one driver's tri-state enable signal asserted during a given clock phase). This can significantly improve interconnect routing channel density between and within the datapath FUBs for a given bus bandwidth.

Figure 4:
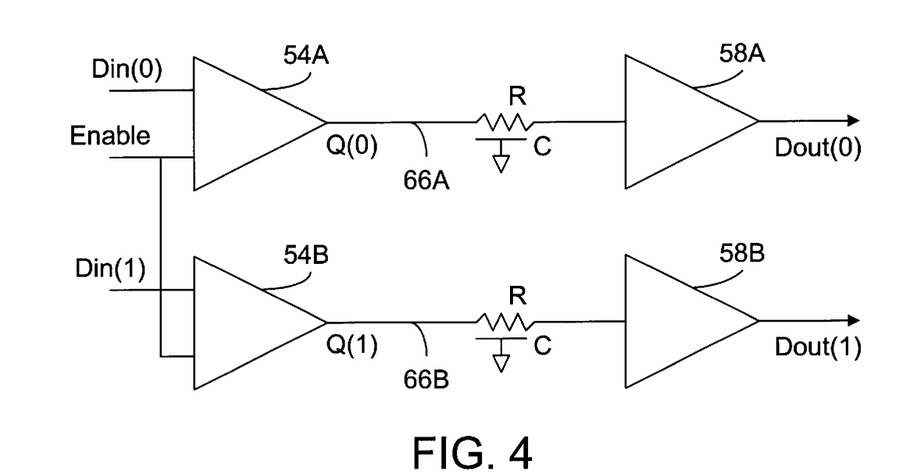
FIG. 4 illustrates two single ended drivers, interconnects, and receivers in parallel.

In many implementations, different bits of a multi-bit signal are conveyed in parallel interconnects of single ended interconnect systems such as in FIGS. 2 and 3. For example, FIG. 4 illustrates bit 0 and bit 1 of a multi-bit signal. Bit 0 is represented as Din(0) received by driver 54A, Q(0) on interconnect 66A, and Dout(0) at the output of receiver 58A. Bit 1 is represented as Din(1) received by driver 54B, Q(1) on interconnect 66B, and Dout(1) at the output of receiver 58B.

Figure 5:
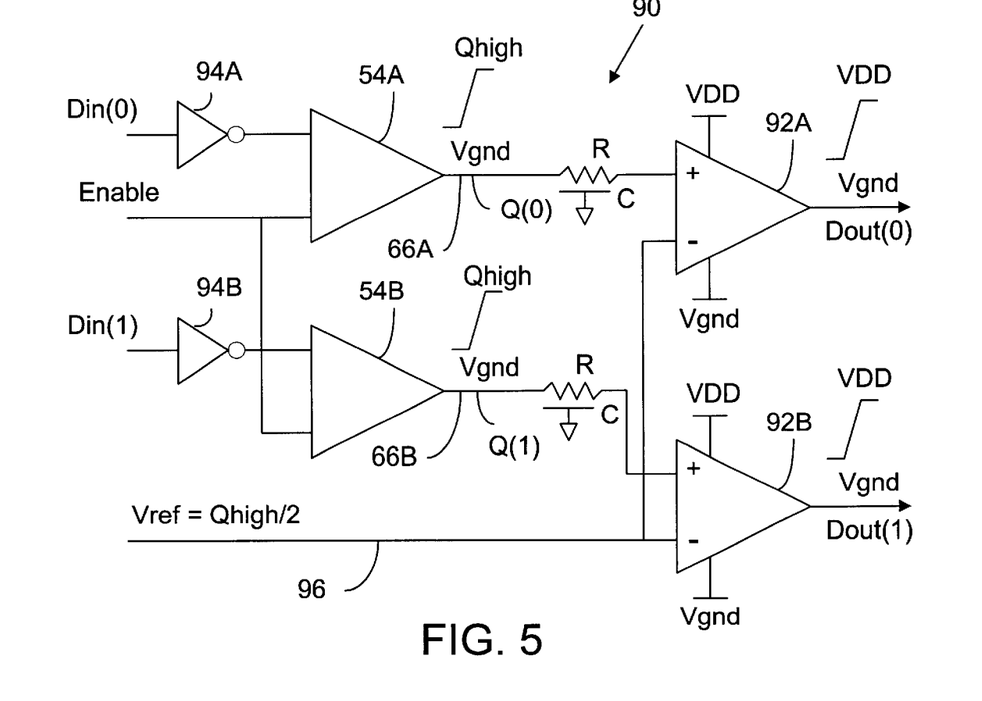
FIG. 5 is a schematic representation of a pseudo-differential system including a single ended drivers, interconnects, and differential receivers according to some embodiments of the invention.

FIG. 5 illustrates two bits of a pseudo-differential interconnect system 90. Bit 0 is represented as Din(0), Q(0) on interconnect 66A, and Dout(0) at the output of fully differential receiver 92A. Bit 1 is represented as Din(1), Q(1) on interconnect 66B, and Dout(1) at the output of fully differential receiver 92B. Interconnects 66A and 66B are referred to as bit interconnects because they carry bit signals, even if at a reduced swing. Din(0) and Din(1) swing between 0 and Vdd. Q(0) and Q(1) swing between 0 and Qhigh. Depending on the particular implementation of drivers 54A and 54B, Qhigh may be equal to or less than Vdd. System 90 illustrates optional inverters 94A and 94B which invert Din(0) and Din(1) before they are received by drivers 54A and 54B, respectively. Inverters 94A and 94B may be used as drivers to increase the voltage of Din(0) and Din(1). Depending on the implementation, Q(0) and Q(1) follow or are the complement of Din(0) and Din(1), respectively. Depending on the implementation, Dout(0) and Dout(1) follow or are the complement of Q(0) and Q(1), respectively.

System 90 includes a reference interconnect 96 which carries a signal Vref. In some embodiments, Vref=Qhigh/2. In some embodiments, there is one reference interconnect for every 8 to 16 bit interconnects, of which interconnects 66A and 66B are examples. (Other ratios of references to interconnects may be used.) Accordingly, in system 90, the interconnect area penalty is substantially lower than in the prior art fully-differential scheme, while achieving the high common mode noise rejection advantage they enjoy. In some embodiments, when Vref=Qhigh/2 and Vref is set to a fixed DC bias voltage midway between the interconnect signal swing. Fully-differential receivers 92A and 92B receive signals Q(0) and Q(1), which may be reduced swing signals, and the reference voltage and deliver full-swing outputs Dout(0) and Dout(1). Because the reference interconnect is set to a fixed voltage (i.e., it does not transition), the dynamic power reduction achieved due to the lowered interconnect signal swing is retained, unlike a prior art fully-differential interconnect system wherein the switched capacitance is doubled.

The following sections provide examples of drivers 54 and 74, and receiver 58. As described below, in some embodiments, a prior art receiver (such as an inverter or two inverters in series) may be used.

B. Drivers

1. Drivers with Low Voltage Swing

Figure 6:
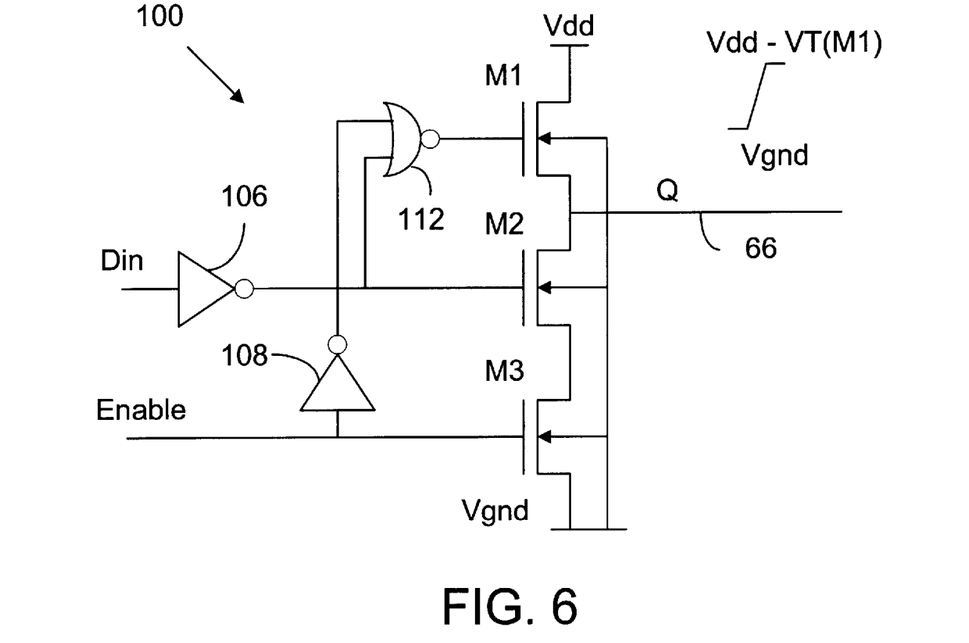
FIG. 6 is a schematic representation of a single ended driver according to some embodiments of the invention.

In one embodiment, driver 54 may be a single-ended, tri-stated driver that uses an n-channel field effect transistor (nFET device) to provide a reduced voltage swing. In such a case, circuit 50 would be a mixed swing signal. Referring to FIG. 6, a driver 100 includes an nFET device M1, the gate of which receives the output of NOR gate 112. Data-in (Din) is inverted by an inverter 106. The output of inverter 106 is provided to the gate of an nFET device M2 and to one input to NOR gate 112. The enable signal (also called tri-state enable signal) is provided to the gate of an nFET device M3 and is inverted by an inverter 108, the output of which is provided as another input to NOR gate 112. The output of NOR gate 112 can be written as (En*+Din*)*. The operation of driver 100 can be illustrated through Table 1, below.

TABLE 1

| Enable | Din | (En* + Din*)* | M1 | M2 | M3 | Q |
|---|---|---|---|---|---|---|
| 0 | 0 | 0 | OFF | ON | OFF | Tri state |
| 0 | 1 | 0 | OFF | OFF | OFF | Tri state |
| 1 | 0 | 0 | OFF | ON | ON | Vgnd |
| 1 | 1 | 1 | ON | OFF | ON | Vdd − Vt |

According to Table 1, if the Enable signal is unasserted (low), both M1 and M3 are OFF so that conductor 66 is in a tri-state high impedance condition regardless of the state of Din. When the Enable signal is unasserted, driver 100 is tri-stated, enabling other drivers connected to the same line to drive during the same clock phase. If enable is asserted (high), Q follows Din. However, because device M1 is an nFET device rather than a p-channel FET (pFET) device, nFET device M1 can pull signal Q up to only Vdd−Vt, which Vt is the threshold voltage of device M1. Note that in some embodiments, except for unintentional parameter variations, each nFET transistor in driver 100 and perhaps also receiver 58 may have the same threshold voltage. Alternatively, M1 may have a different threshold voltage through engineering or a voltage technique such as providing a forward body bias, described below. NFET device M1 is referred to as a source follower transistor because its source (at conductor 66) follows the input signal at the gate of M1.

Advantages of driver 100 include that because it is single ended, less space is used and less power is consumed than prior art fully differential techniques which uses two interconnects. Less power is also used because of the lower voltage swing (i.e., Vdd−Vt, rather than Vdd) when compared to a full swing driver. The dynamic power reduction may be linear as Vdd−Vt is reduced from Vdd. An nFET device has roughly 2 to 2½ times the transconductance of a pFET device for the same size. Therefore, for the same size, an nFET device M1 pulls up faster than would a pFET device. Alternatively, nFET device M1 can be made smaller and trade off some switching speed. Driver 100 switches from high to low faster than do full swing drivers, because it does not have as far to go before reaching a trip point. However, this leads to lower noise immunity because high voltage signals (Vdd−Vt) are closer to the switching point Vdd/2. Accordingly, it is valuable to use a receiver 58 that has hysteresis such that interconnect signal Q has to go considerably below the trip point for a high to low transition. Such receivers are described below.

The reduced voltage swing across the load may result in a nearly linear reduction in driver delay compared to full-swing operation. This delay improvement may be achieved without a loss in the driver transistors' on-drive voltage (Vgs). Prior static CMOS-based low swing drivers for datapath interconnects suffer from a linear reduction in on-drive voltage with reducing voltage swings and hence offer much lesser delay improvement. The present approach enables considerable down-sizing of the driver transistors for a target delay constraint, leading to further power savings as well as layout area savings. Alternately, repeaterless interconnects can be driven for much longer distances on-chip than prior art approaches.

Because the driver is static (the interconnect state is switched only with a data transition), interconnect dynamic power may drop linearly with reducing interconnect switching activity. This represents a substantial savings in power compared to other dynamic prior art approaches, because such schemes precharge and evaluate the bus every cycle independent of input data activity, contributing to a large dynamic power loss at low input data activities.

Driver 100 may share the power and ground rails (Vdd and Vgnd) with peripheral circuitry (operating at CMOS levels, Vdd and Vgnd). Thus, no additional power supply rails (and associated circuitry) are needed. As compared to some prior art CMOS based low swing drivers, this provides a significant reduction in layout size.

The high drive impedance provided by nFET device M1 when Q is at Vdd−Vt offers substantially improved driver-end power supply noise rejection when compared with conventional full-swing static CMOS approaches which use a pFET device in place of nFET device M1. This is due to the relatively high drain-source impedance of the nFET-only driver.

Figure 7:
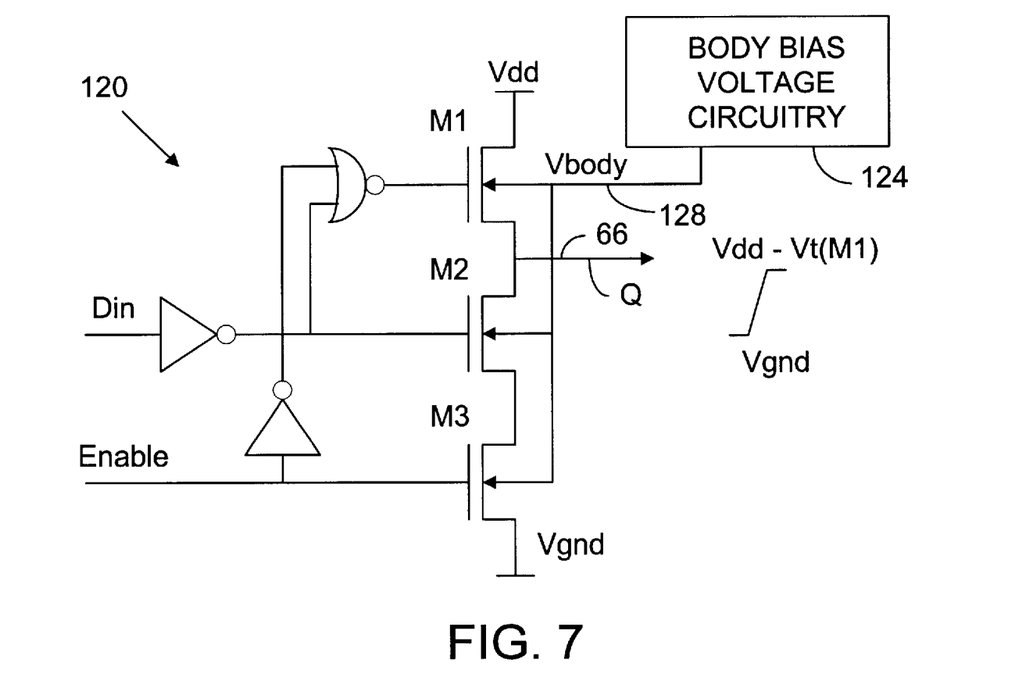
FIG. 7 is a schematic representation of a single ended driver according to some embodiments of the invention.

The threshold voltage Vt of nFET device M1 can be changed by changing the bias voltage Vbody applied to the body of M1. Referring to FIG. 7, a driver 120 is like driver 100 (in FIG. 6) except as follows. In driver 100, the bodies of devices M1, M2, and M3 are tied to Vgnd, so there is a zero bias, whereas in driver 120, the bodies of devices M1, M2, and M3 are connected to the output of body bias voltage circuitry 124. Circuit 124 provides a voltage Vbody on a conductor 128, which may be greater than Vgnd (in which case devices M1, M2, and M3 are forward biased), equal to Vgnd, or less than Vgnd (in which case devices M1, M2, and M3 are reverse biased). A forward bias of the source-drain junction reduces the driver devices' threshold voltage, contributing to further delay improvement but may increase power consumption. Conductor 128 may be connected to various places including body taps and the bottom of the substrate. Body bias voltage circuitry 124 may include feedback circuitry to keep Qhigh at a desired value or maintain another parameter(s). Devices M1, M2, and M3 may share a common body (although they may be referred to as separate bodies) or, for example, have separate bodies in different wells. If device M1 is isolated from devices M2 and M3, the body of device M1 could be connected to conductor 128 as illustrated in FIG. 7, while the body of devices M2 and M3 could be connected to Vgnd as illustrated in FIG. 6. Body bias may be applied to transistors of the other circuits illustrated and/or described herein.

2. Drivers with Full Swing

Figure 8:
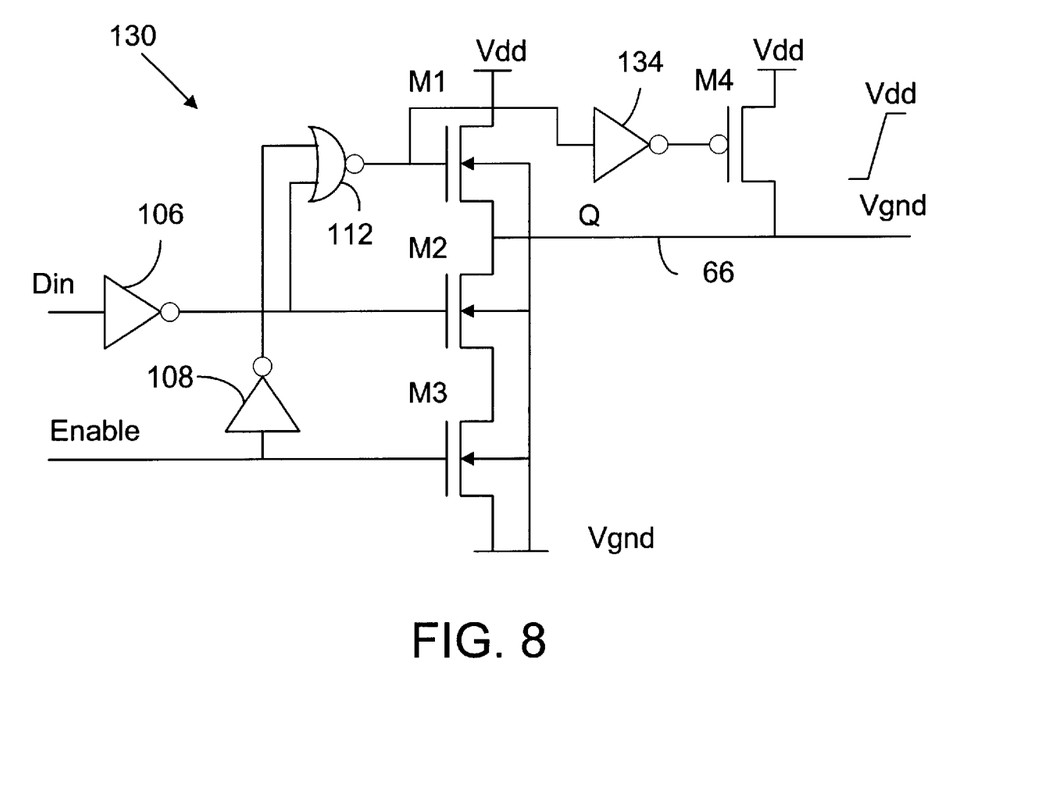
FIG. 8 is a schematic representation of a single ended driver according to some embodiments of the invention.

Referring to FIG. 8, driver 130 is similar to driver 100 except that driver 130 includes a pFET device M4 and an inverter 134 between the output of the gate of nFET device M1 and pFET device M4. Driver 130 is, therefore, referred to as a p-boosted driver. NFET device M1 does almost all the work in pulling Q high, but can only pull to Vdd−Vt. After the delay of inverter 134, pFET device M4 pulls Q the remainder of the way to Vdd. PFET device M4 is considerably weaker than is nFET device M1. Advantages of a p-boosted driver include that it has a full swing, which may lead to better noise immunity if a prior art receiver is used. Further, pFET device M4 and inverter 134 may be considerably smaller than would a pFET device that does all the pulling up.

3. Quasi-Static Driver

Drivers 100, 120, and 130 are static drivers in that the interconnect signal Q toggles (changes from low to high or high to low) only when the Din signal toggles (and when the enable signal is asserted if an enable signal is included in the driver). Accordingly, the static drivers consume static power only when the data signal is high (and the enable signal is asserted if there is one). There is no dynamic power consumption (doesn't change with every clock cycle).

Figure 9:
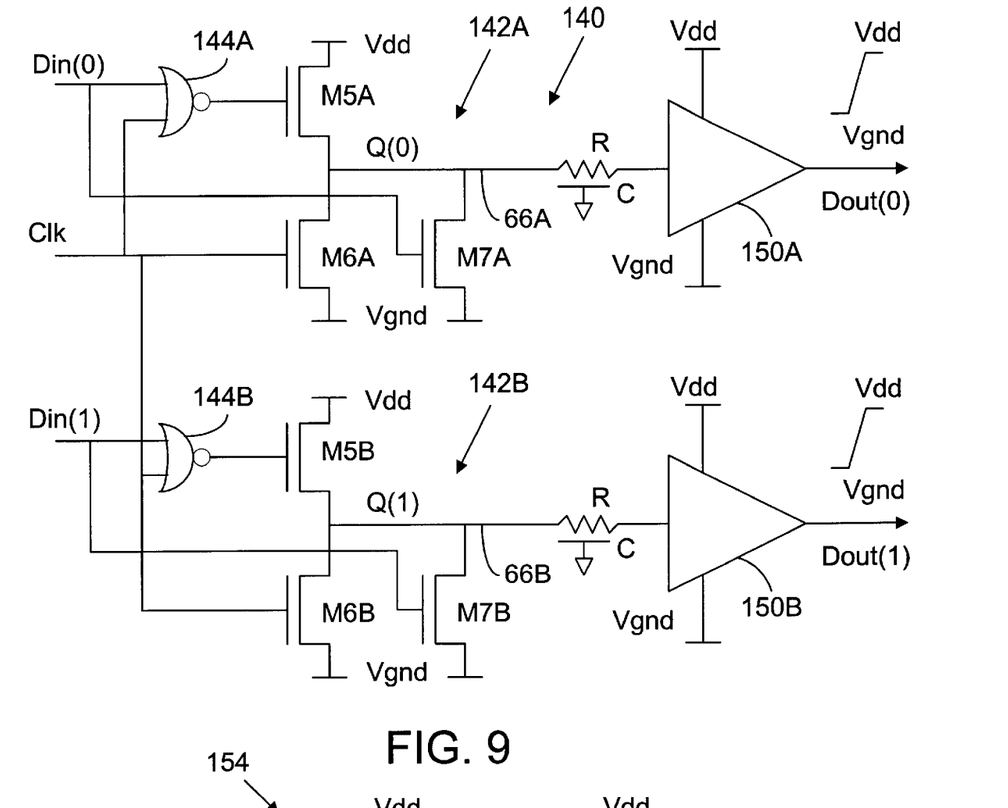
FIG. 9 is a schematic representation of a quasi-static interconnect system according to some embodiments of the invention.

Referring to FIG. 9, a quasi-static interconnect system 140 illustrates quasi-static drivers 142A and 142B for bits 0 and 1 of a multiple bit signal, which are representative of other drivers and bits in system 140. Driver 142A includes nFET devices M5A, M6A, and M7A. The gate of device M5A is connected to the output of a NOR gate 144A. Driver 142B includes nFET devices M5B, M6B, and M7B. The gate of device M5B is connected to the output of a NOR gate 144B. Interconnect signals Q(0) and Q(1) on conductors 66A and 66B are the complement of Din(0) and Din(1) when the clock (Clk) is low (although the quasi-static drivers could be modified so that Q(0) and Q(1) follow the state of Din(0) and Din(1). Table 2 illustrates the operation of driver 142A, and is representative of the operation of driver 142B. Table 2 shows the state of the output of NOR gate 144A and the interconnect signal Q(0) as a function of the Clk and Din(0) inputs.

TABLE 2

| Clk | Din(0) | (Clk + Din(0))' | Q(0) |
|---|---|---|---|
| 0 | 0 | 1 | Vdd − Vt |
| 0 | 1 | 0 | Vgnd |
| 1 | 0 | 0 | Vgnd |
| 1 | 1 | 0 | Vgnd |

The Miller Coupling Factor (MCF) describes a phenomenon wherein the capacitance of an interconnect is increased when it has a changing voltage but its a neighboring interconnect(s) does/do not. The MCF may be doubled where the switching is anti-phase. In quasi-static interconnect system 140, the interconnect signals Q on the different interconnects is pre-discharged simultaneously when Clk is high so that the Q1 and Q2 signals always start at low. The interconnect signals Q then switch depending on the Din signals when the clock goes low. This prevents anti-phase MCF.

System 140 includes receivers 150A and 150B, which are representative of other receivers in the system. Although a variety of receiver designs may be used, a driver (as described below) that is insensitive to high to low transitions would be preferred for some applications.

Figure 10:
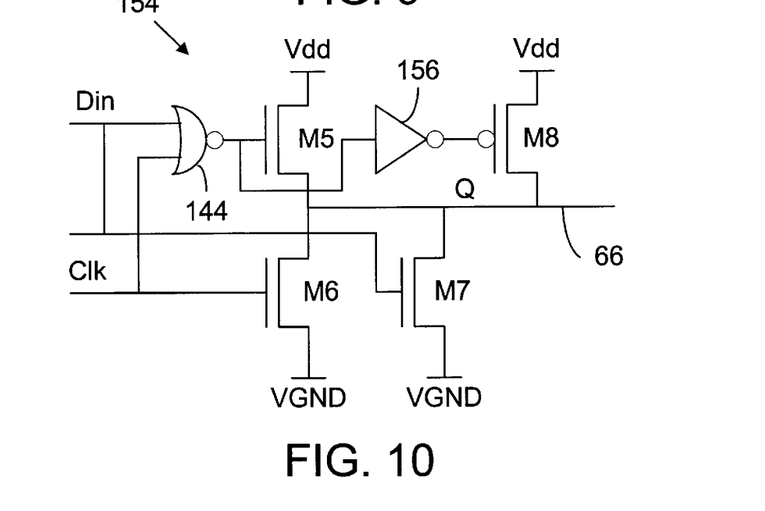
FIG. 10 illustrates a p-boosted version of one of the drivers of the system of FIG. 9.

Referring to FIG. 10, a p-boosted quasi-static driver 154 is shown which is similar to driver 142A except that it includes an inverter 156 and a pFET device M8. NFET device M5 does most of the work in pulling up interconnect signal Q. After a delay through inverter 156, pFET device M8 pulls Q to Vdd. PFET device M8 and the transistors of inverter 156 may be relatively small.

4. Dual-Rail Pseudo-Differential Driver

Figure 14:
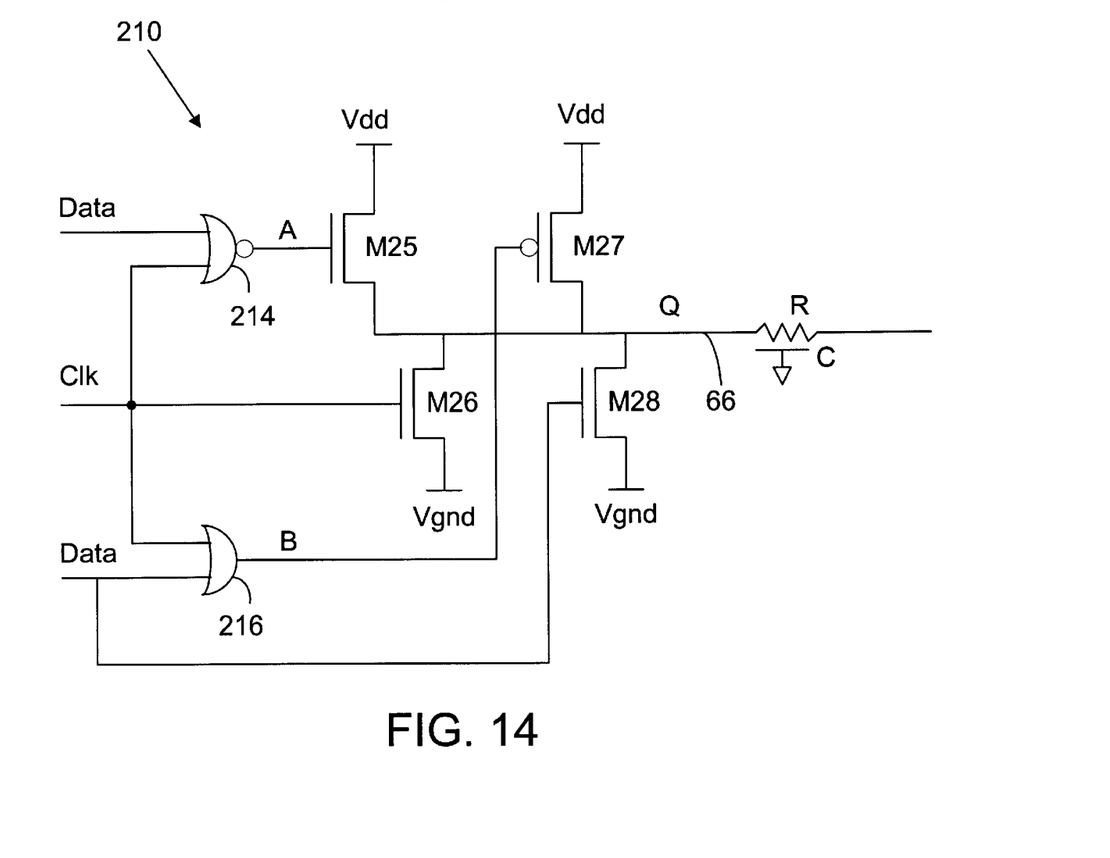
FIG. 14 is a schematic representation of a dual rail driver according to some embodiments of the invention.

Referring to FIG. 14, a single ended dual rail pseudo differential driver 210 includes a NOR gate 214 and an OR gate 216 that receive a clock (Clk) signal and a Data signal. A signal A is at the output of NOR gate 214 and a signal B is at the output of OR gate 216. Driver 210 includes a source follower nFET device M25 and a p-booster pFET device M27, as well as pull down nFET devices M26 and M28. Signal A is high when both the Clk and data signals are low, but is otherwise low. Signal B is low when both the Clk and data signals are low, but is otherwise high. When the Clk signal transitions from low to high, signal Q is predischarged. Then, after the Clk signal returns to low, the signal Q is the opposite state of the Data signal. There is no contention offered by nFET device M26 to the pull-up devices M25 and M27. This lack of contention offers significant performance improvement over prior art CMOS drivers.

C. Receiver Circuits

A variety of receiver circuits may be used in connection with the single ended driver circuits.

1. Hysteretic Receivers

Receivers 170 and 190, described below, may be used as receiver 58 in FIGS. 2 and 3.

a. A First Hysteretic Receiver

Figure 11:
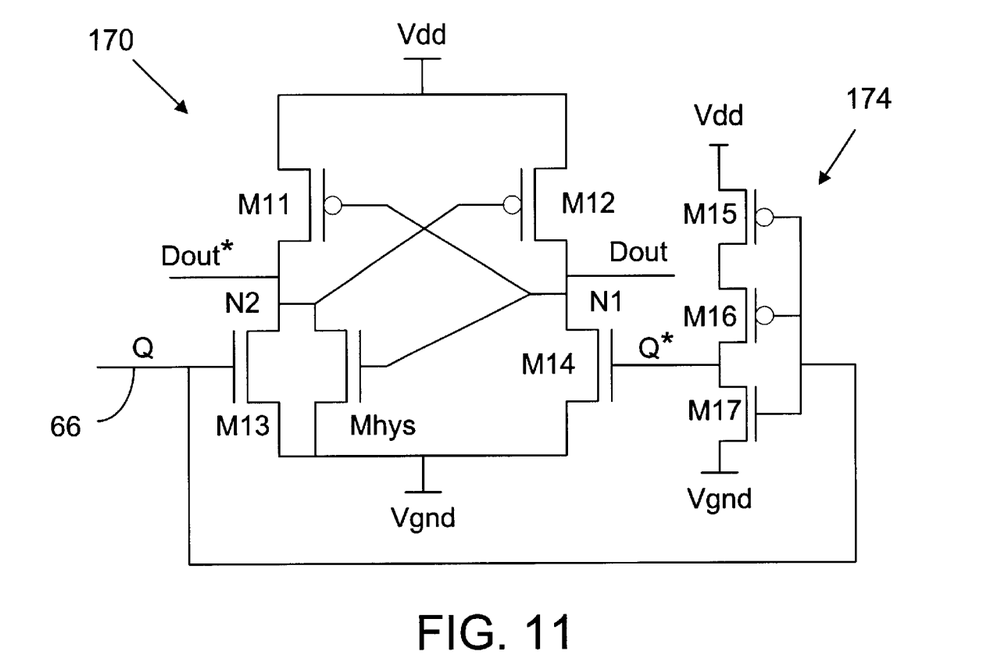
FIG. 11 is a schematic representation of a receiver according to some embodiments of the invention.

As mentioned, referring to FIGS. 2 and 3, drivers 54 and 74 drive an interconnect signal Q having a swing between Vgnd and Qhigh. Where Qhigh is less than Vdd (e.g., Vdd−Vt), the noise margin between Qhigh and Vdd/2 is relatively low. Noise that would not cause Vdd to dip below Vdd/2, may cause Vdd−Vt to dip below Vdd/2. Referring to FIG. 11, to solve this problem, a hysteretic single ended receiver 170 requires interconnect signal Q to go substantial below the forward going trip point to trip a high to low transition. Receiver 170 provides high noise immunity in a single ended interconnect system that has the performance and power savings advantage of a mixed swing technique and the interconnect density of a single ended system.

Referring to FIG. 11, in the following description, it is assumed Q is a low voltage swing signal where Qhigh is Vdd−Vt absent noise, but receiver 170 will provide hysteresis and the description is largely applicable if Qhigh is Vdd or some other high value absent noise. Receiver 170 includes an output signal Dout with a voltage Vout that follows the voltage Vin of single ended interconnect signal Q (as opposed to a differential input). It may also be desirable to have a Dout* signal, which is the complement of Dout. In FIG. 11, Dout is at node N1 and Dout* is at node N2. The voltage of Dout and Dout* could be increased by putting an inverter at nodes N1 and N2 and having Dout be at the output of the inverter on node N2 and Dout* be at the output of the inverter on node N1.

Figure 13:
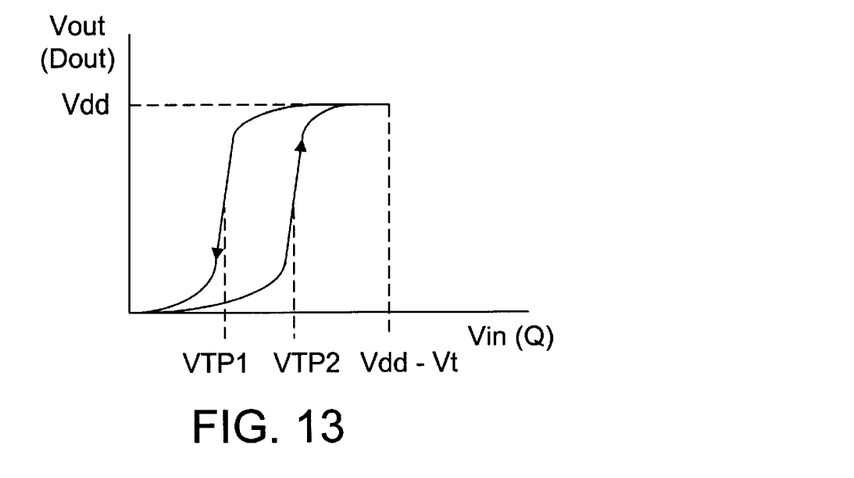
FIG. 13 is a graph illustrating hysteretic features of the receivers of FIGS. 11 and 12.

The hysteretic nature of receiver 170 is illustrated with FIG. 13 (which may be somewhat idealized) wherein a forward trip point (low to high voltage) VTP2 of Q(Vin) at which Dout switches from a low to high voltage is significantly higher than a reverse trip point VTP1 (high to low voltage) of Vin at which Dout switches from a high to a low voltage. As an example, VTP2 may be Vdd/2 (or another value).

Receiver 170 includes inverter 174, having pFET devices M15 and M16 and an nFET device M17, the output of which is a signal Q* which is the complement of Q. When Q is low, an nFET device M13 is OFF, Q* is high, M14 is ON, Dout is low, an nFET device Mhys (for hysteresis) is OFF, a pFET device M11 is ON pulling node N2 high turning OFF a pFET device M12. PFET devices M11 and M12, which are cross-coupled together, and nFET devices M13 and M14, which receive signals Q and Q*, look similar to a cascode voltage switched gate. However, they differ from a cascode voltage switched gate because of the inclusion of nFET device Mhys.

When Q is changed from Vgnd (low) to Vdd−Vt, which is greater than VTP2, M13 turns ON, pulling down node N2, which turns M12 ON. With M12 ON, node N1 is pulled up. Contention between M12 and M14 is quickly resolved because with Q being high, M15 and M16 turn OFF, and M17 turns ON pulling Q* low. With Q* low, M14 turns OFF. As node N1 is pulled high, transistor M11 is turned OFF and transistor Mhys is turned ON to accelerate the fall of node N2. Accordingly, transistor M12 is turned on stronger as transistor M14 is turned OFF.

The nFET device Mhys contributes to the hysteretic receiver 170 as follows. When Mhys is at ground, it acts as a drain follower device (i.e., the drain follows the inverse of the input Q) with the gate tied to Vdd. Node N2 is pinned to Vgnd by Mhys. If Q goes below the trip point VTP2 because of noise, M13 starts to turn OFF, but transistor Mhys will continue to be ON keeping node N2 low and M12 ON. M15 and M16 may turn partially ON and M17 may turn partially OFF so that Q* is higher such that M14 may turn partially ON. There may be some contention between M12 and M14, but not enough to pull node N1 low and completely turn Mhys OFF. However, if Q is pulled low, below VTP1, M13 will turn OFF, Q* will be pulled high turning M14 ON, which will pull node N1 low and turn OFF Mhys and turn ON M11. With node N2 high, M12 turns OFF. Generally speaking, the reverse trip point VTP 1 is the point at which these other effects of receiver 170 can overcome the hysteretic effect of Mhys. By properly sizing devices Mhys and parameters such as the size of M11, M12 and perhaps M14, a proper reverse trip point VTP1 may be selected and the desired noise immunity be provided. As well as significantly contributing to the hysteresis, Mhys increases the speed at which node N2 is pulled down, adding to the overall speed (and decreasing the delay) of receiver 170.

In the case in which Q is Vdd-Vt, M17 will be ON, but M15 and M16 might not be completely OFF. Accordingly, there may be a small amount of static current through M5 and M16. By stacking M15 and M16, that amount of static current is significantly reduced. The stack of M15 and M16 also reduces leakage current which helps with noise immunity. When a device is leaky, it may act like a biased amplifier and tend to be near a precipice of switching.

b. A Second Hysteretic Receiver

Figure 12:
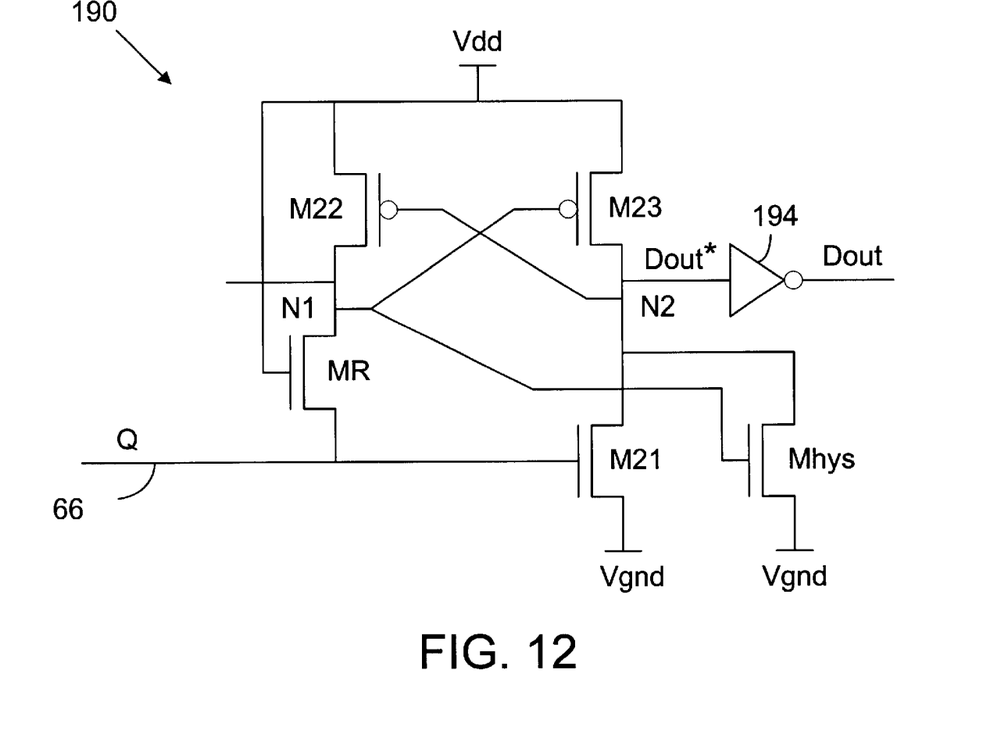
FIG. 12 is a schematic representation of a receiver according to some embodiments of the invention.

Referring to FIG. 12, a hysteretic receiver 190 has a forward trip point VTP2, which is greater than a reverse trip point VTP1, similar to that shown in FIG. 13. Receiver 190 includes nodes N1 and N2. As illustrated, receiver 190 includes an inverter 194. An output signal Dout (having a voltage Vout) is provided the output of inverter 194. To the extent a signal Dout* (the complement of Dout) is desired, it can be obtained at node N2 or at the output of another inverter (not shown) in series with inverter 194. Dout may be at node N1. It is assumed Q is a low voltage swing signal where Qhigh is Vdd–Vt absent noise, but receiver 190 will provide hysteresis and the description is largely applicable if Qhigh is Vdd or some other high value absent noise.

As explained above, in receiver 170, static power is reduced, but not eliminated. In receiver 190, the static power is eliminated. Assuming signal Q switches from 0 to Vdd–Vt, when Q is high, nFET device M21 turns ON and pulls node N2 low, turning on a pFET device M22. When M22 is ON, a node N1 goes high, which turns a pFET device M23 OFF. With node N1 high, an nFET device Mhys is turned ON accelerating the fall of node N2. Accordingly, Mhys increases the speed at which Dout switches to high. An nFET device MR (called a riding device) has its gate tied to Vdd. MR is ON when Q is low, because Vgs is roughly Vdd. However, as Q goes from 0 to Vdd–Vt, Vgs is Vdd–(Vdd–Vt)=Vt, which roughly the Vt of MR. (It is assumed that the Vts of the transistors is roughly equal to the Vt of the driver, although that is not required.) Accordingly, MR turns OFF. There is not a static (DC) path between power supply Vdd and ground. When Q is at Vdd–Vt, MR does see a direct path from Vdd to ground so that there is no DC current through MR. Accordingly, with receiver 190 there is hysteretic noise immunity without having a DC path from Vdd to ground.

The drain to source resistance of MR is very high when Vgs≦Vt. Q is protected from power supply by the very high impedance. Accordingly, signal Q is isolated from noise on Vdd (power supply) because of high impedance when input at Vdd–Vt. This offers substantially improved receiver power supply noise rejection as compared to conventional static CMOS receiver.

If noise on signal Q pulls signal Q below VTP2, M21 will be partially turned OFF. Further, node N1 will be lowed somewhat through device MR, which will begin to turn ON. However, if Q does not go below VRP1, node N1 will continue to keep Mhys ON enough to keep node N2 low and node N1 will not be low enough to sufficiently turn ON M23 to pull up node N2. If signal Q goes below VTP1, M21 will turn substantially OFF, MR will turn ON sufficiently to pull node N1 low, which will turn OFF Mhys. Further, with node N1 low, M23 will turn on, pulling up node N2 and turning OFF M22.

Both receivers 170 and 190 are static. Therefore, receiver dynamic power consumption drops linearly with reducing bus switching activity, i.e., the receiver load capacitance is switched only when input data transitions, else the state is retained. This represents a substantial savings in power compared to other dynamic prior art receiver approaches, because such schemes precharge and evaluate the receiver outputs every cycle independent of input data activity, contributing to a large dynamic power loss at low input data activities.

In receivers 170 and 190, power and ground rails (Vdd and Vgnd) may be shared with peripheral circuitry operating at CMOS levels, so that additional power rails are not necessary.

Since receivers 170 and 190 have only a single-ended input, transmitting the complementary signal (as in prior art fully-differential approaches) is not required. This eliminates the power consumed in driving the complementary interconnect as well as the driver and interconnect layout area associated with transmitting the complementary signal.

2. A Receiver for Quasi-Static Drivers

Figure 15:
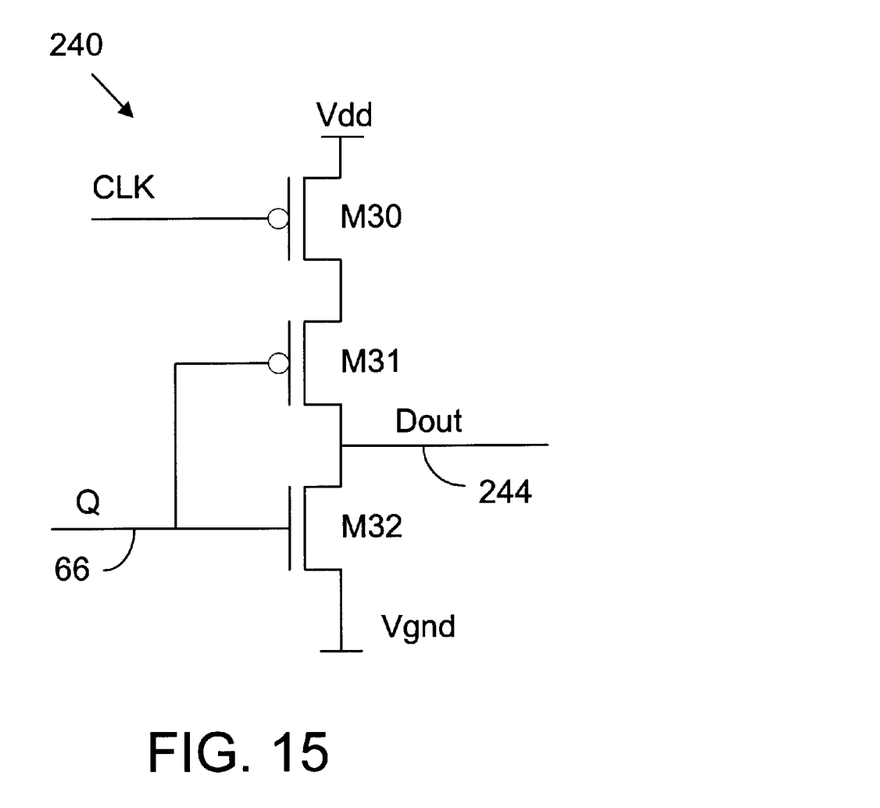
FIG. 15 is a schematic representation of a single ended driver according to some embodiments of the invention.

Referring to FIG. 15, receiver 240 is an example of receivers 150A and 150B of quasi static interconnect system 140 in FIG. 9. Receiver 240 includes pFET transistors M30 and M31 and nFET device M32. Receiver 240 is insensitive to a high to low transition when the Q signal is pre-discharged because the clock is high so that M30 is OFF. When Clk is low, Dout is the inverse (complement) of interconnect signal Q. When Q is low and Clk is high, output conductor 244 is in a high impedance tri-state condition and retains its previous state.

D. Bidirectional Signaling

In the case of tri-stated drivers, such as driver 100, multiple drivers can drive the same bus (with only one driver's tri-state enable signal asserted during a given clock phase). Bidirectional signaling may occur on the interconnects by controlling timing of the signaling and the enable signals. This has the potential to offer a full 2X or more improvement in bandwidth compared to a uni-directional repeater-based transceiver circuit.

Figure 17:
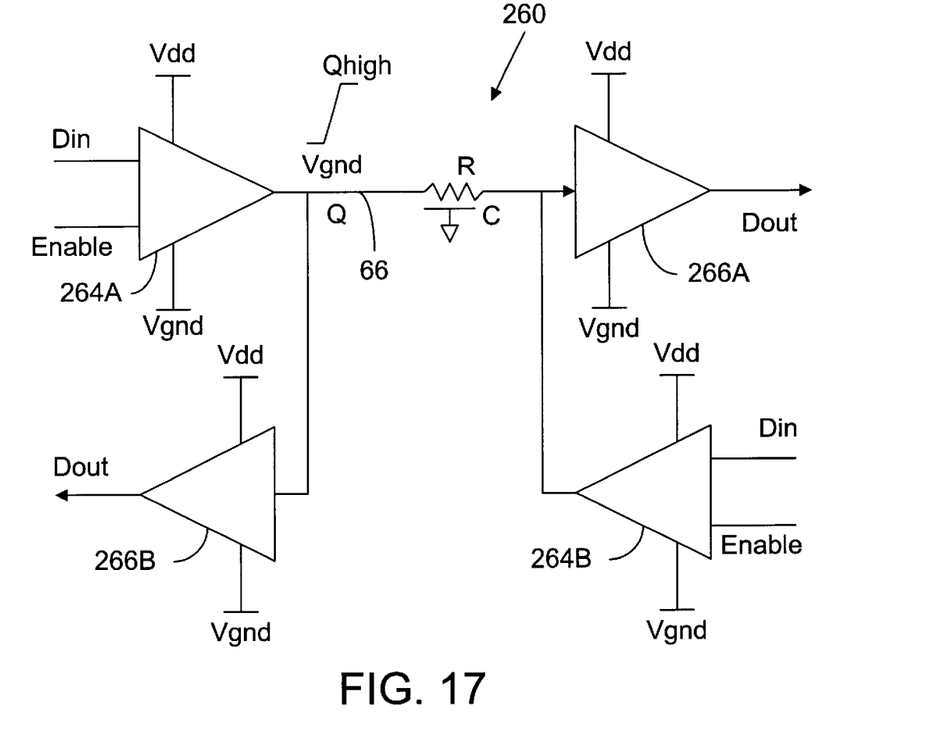
FIG. 17 is a schematic representation of a bidirectional interconnect system.

For example, referring to FIG. 17, in an interconnect system 260, data is transmitted in opposite directions on interconnect 66. System 260 includes single ended drivers 264A and 264B receiving enable signals and single ended receivers 266A and 266B. Examples of drivers 264A and 264B include drivers 100, 120, or 130 in FIGS. 6–8. At certain times, driver 264A is enabled and driver 264B is not and vice versa. For example, in some embodiments, during a first half phase of a clock cycle, driver 264A is enabled and driver 264B is not enabled, so that the output of driver 264B is in a high impedance state. During the second half phase of the clock cycle, driver 264B is enabled and driver 264A is not enabled, so that the output of driver 264A is in a high impedance state. (There may be more than two drivers participating in signaling over interconnect 66. In such a case, a clock cycle might be divided into more than two phases.)

Figure 18:
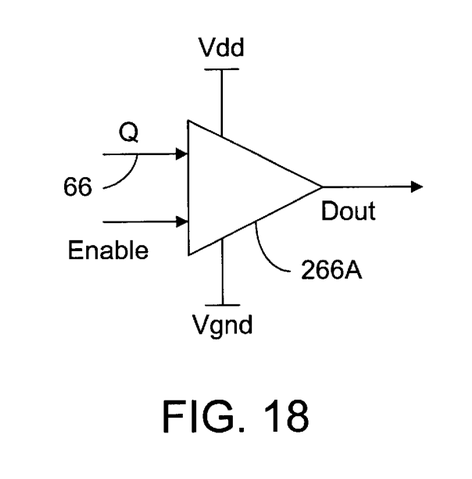
FIG. 18 is a schematic representation of an enabled receiver for use in the system of FIG. 17.
Figure 19:
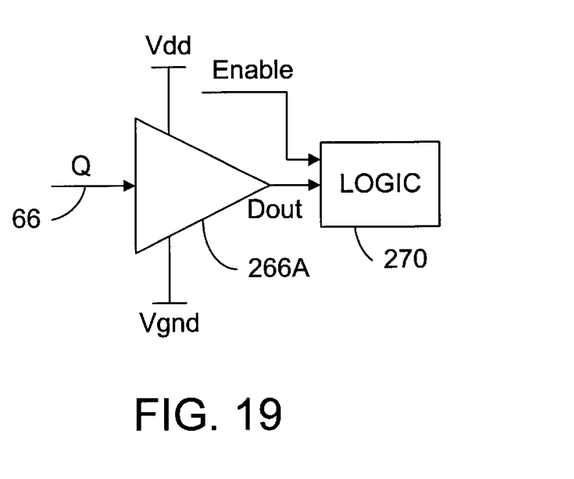
FIG. 19 is a schematic representation of a receiver, for use in the system of FIG. 17, connected to logic which receives an enable input signal.

There are at least three possible receiver arrangements. Under a first scheme, each receiver is allowed to switch regardless of which driver is driving interconnect 66. However, the output of receiver 266B may be ignored during the phase in which driver 264A is driving a signal on interconnect 66. Likewise, the output of receiver 266A may be ignored during the phase in which driver 264B is driving a signal on interconnect 66. Under a second scheme, illustrated in FIG. 18, the receivers receive enable signals and are allowed to switch only when enabled. Under a third scheme, illustrated in FIG. 19, the receivers do not receive enable signals but logic (e.g., logic 270) at the output of the receives does.

E. Other Information and Embodiments

Figure 16:
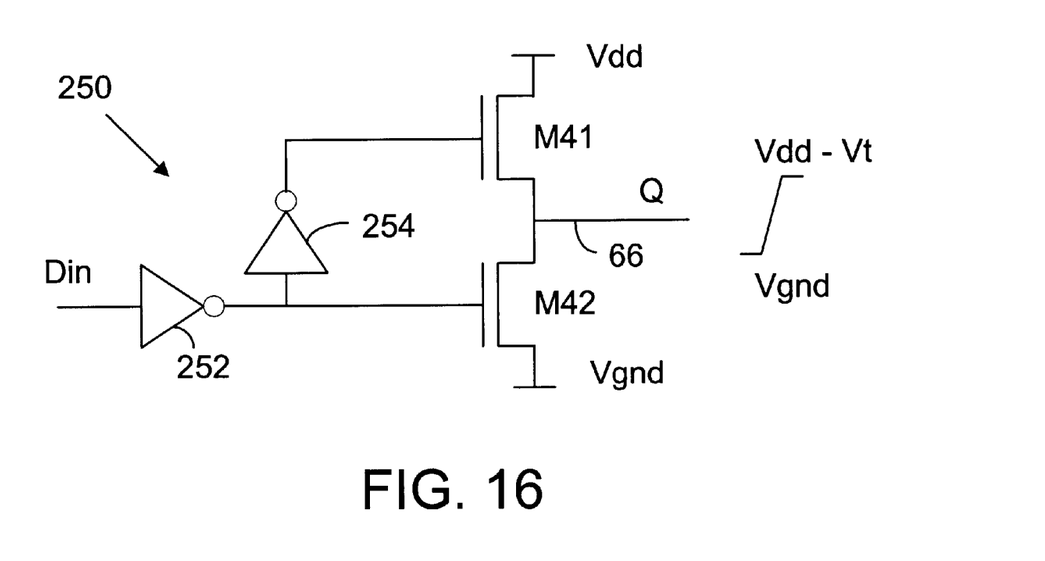
FIG. 16 is a schematic representation of a single ended driver according to some embodiments of the invention.

FIG. 16 illustrates a driver 250 without tri-state capability (e.g., that could be used in FIG. 3). Driver 250 includes nFET transistors M41 and M42 and inverters 252 and 254.

Although the illustrated embodiments include enhancement mode transistors, depletion mode transistors could be used in place of some or all the transistors.

It is not necessarily required that Vdd of the driver equal Vdd of the receiver.

Examples of hysteretic circuits are described herein in connection with FIGS. 11 and 12. Although the circuits in FIGS. 11 and 12 are presented as receivers for interconnect signals, the circuits may be used in various other contexts such as an output stage for a reduced voltage domino circuit.

There may be intermediate structure (such as a buffer or driver to increase the voltage of a signal) between two illustrated structures or within a structure (such as a circuit or conductor) that is illustrated as being continuous. The borders of the boxes in the figures are for illustrative purposes and not intended to be restrictive. Arrows show certain signal flow in certain embodiments, but not every signal, such as control signals and requests for data.

If the specification states a component, feature, structure, or characteristic "may", "might", or "could" be included, that particular component, feature, structure, or characteristic is not required to be included. Reference in the specification to "some embodiments" means that a particular feature, structure, or characteristic described in connection with the embodiments is included in at least some embodiments, but not necessarily all embodiments, of the invention. The various appearances "some embodiments" are not necessarily all referring to the same embodiments.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. An interconnect system comprising:

interconnects;

quasi-static drivers to transmit interconnect signals on the interconnects, the quasi-static drivers including inputs to receive a clock signal and respective data-in signals, and wherein the interconnect signals are pre-discharged when the clock signal changes from a first to a second state, and wherein when the clock signal is in the first state, the interconnect signals are related to the data-in signals, and wherein the drivers include a pFET pull-up device and an nFET pull-up device to selectively pull the interconnect signals high wherein the drivers transmit the interconnect signals that have a high voltage equal to a power supply voltage minus a threshold voltage of the nFET device and wherein the system further includes body bias voltage circuitry to control the threshold voltage of the nFET device; and receivers connected to respective ones of the interconnects.

2. The system of claim 1, wherein the first state is a low voltage and the second state is a high voltage.

3. The system of claim 1, wherein the interconnect signals are related to the data-in signals in an inverse relationship.

4. The system of claim 1, wherein the drivers are dual-rail pseudo-differential drivers.

5. The system of claim 4, wherein in each of the drivers a second nFET device is coupled between the corresponding interconnect and a ground node and the clock signal is applied to a control input of the second nFET device.

6. The system of claim 1, wherein the body bias voltage circuitry provides a forward body bias to the nFET device.

7. The system of claim 1, wherein the body bias voltage circuitry selectively provides a forward body bias to the nFET device.

8. A chip comprising:

quasi-static drivers to transmit output signals, the quasi-static drivers including inputs to receive a clock signal and respective data-in signals, and wherein the output signals are pre-discharged when the clock signal changes from a first to a second state, and wherein when the clock signal is in the first state, the output signals are related to the data-in signals, and wherein the drivers include a pFET pull-up device and an nFET pull-up device to selectively pull the output signals high wherein the drivers transmit the output signals that have a high voltage equal to a power supply voltage minus a threshold voltage of the nFET device and wherein the system further includes body bias voltage circuitry to control the threshold voltage of the nFET device.

9. The chip of claim 8, wherein the first state is a low voltage and the second state is a high voltage.

10. The chip of claim 8, wherein the interconnect signals are related to the data-in signals in an inverse relationship.

11. The chip of claim 8, wherein the drivers are dual-rail pseudo-differential drivers.

12. The chip of claim 11, wherein in each of the drivers a second nFET device is coupled between the corresponding interconnect and a ground node and the clock signal is applied to a control input of the second nFET device.

13. The chip of claim 8, wherein the body bias voltage circuitry provides a forward body bias to the nFET device.

14. The chip of claim 8, wherein the body bias voltage circuitry selectively provides a forward body bias to the nFET device.

* * * * *